US006904592B1

(12) United States Patent
Johnson (10) Patent No.: US 6,904,592 B1
(45) Date of Patent: Jun. 7, 2005

(54) SOFTWARE DOWNLOAD SYSTEM FOR AUTOMATIC RETRIEVAL OF WARRANTY AND COMMISSION DATA

(75) Inventor: William S. Johnson, Santa Clara, CA (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 09/560,473

(22) Filed: Apr. 28, 2000

(51) Int. Cl.[7] .............................................. G06F 9/44
(52) U.S. Cl. ..................................... 717/168; 705/52
(58) Field of Search ................................. 717/168, 169, 717/170, 173, 174, 175, 176, 177, 178, 171, 172; 705/52, 53, 78

(56) References Cited

U.S. PATENT DOCUMENTS

| | | | |
|---|---|---|---|
| 4,714,992 A | 12/1987 | Gladney et al. ............ | 364/200 |
| 5,109,486 A | 4/1992 | Seymore .................... | 395/200 |
| 5,132,716 A | * 7/1992 | Samuels et al. ............ | 396/622 |
| 5,155,847 A | 10/1992 | Kirouac et al. ............. | 395/600 |
| 5,263,164 A | 11/1993 | Kannady et al. ............ | 395/700 |
| 5,421,009 A | 5/1995 | Platt ........................... | 395/600 |
| 5,473,772 A | 12/1995 | Halliwell et al. ........... | 395/650 |

(Continued)

FOREIGN PATENT DOCUMENTS

| | | |
|---|---|---|
| EP | 0950948 A2 | 3/1999 |
| WO | WO 00/36503 | 6/2000 |

OTHER PUBLICATIONS

"Patch from FOLDOC," 1996 [online], accessed Jul. 29, 2004, retrieved from Internet <URL: http://foldoc.doc.ic.ac.uk/foldoc/foldoc.cgi?patch>, 1 page.*

"Re: Online Manual needed (was Re: ISC vs SCO UNIX review)," 1989, online message posted to newsgroup comp.unix.i386, accessed Jul. 29, 2004, Retrieved from Internet <URL: http://groups.google.com/groups?selm=36485@ism780c.isc.com&output=gplain>, 1 page.*

"Computer Associates Unicenter TNG Fuels Tokheim Corporation's Global Enterprise," [online] Dec. 21, 1999 [accessed Dec. 22, 2003], Retrieved from Internet <URL: http://www.findarticles.com/cf_dls/m4PRN/1999_Dec_21/58329154/print.jhtml>, pp. 1–3.*

Nathan J. Muller, "Focus on OpenView: A Guide to Hewlett–Packard's Network and Systems Management Platform," 1995, CBM Books, pp. iii, iv, 179–182.*

Primary Examiner—Todd Ingberg
Assistant Examiner—Eric B. Kiss
(74) Attorney, Agent, or Firm—Withrow & Terranova, PLLC (57) ABSTRACT

A method for upgrading software at remote locations comprises uploading software upgrades to a portable computing device and conveying the portable computing device to the remote locations. The portable computing device ascertains the current software and hardware present at the remote location and installs the requested software upgrade if no incompatibilities are detected. Further, the portable computing device stores a record of what service was performed and what software is presently in existence at the remote location. The portable computing device communicates with a corporate computer the records so created and an accounting is performed.

38 Claims, 6 Drawing Sheets

U.S. PATENT DOCUMENTS

| | | | |
|---|---|---|---|
| 5,566,088 A | * 10/1996 | Herscher et al. | 702/123 |
| 5,600,834 A | * 2/1997 | Howard | 717/171 |
| 5,654,901 A | * 8/1997 | Boman | 717/173 |
| 5,666,293 A | 9/1997 | Metz et al. | 395/200.5 |
| 5,689,640 A | 11/1997 | Okanoue | 395/200.01 |
| 5,745,268 A | * 4/1998 | Eastvold et al. | 398/25 |
| 5,758,071 A | 5/1998 | Burgess et al. | 395/200.5 |
| 5,805,897 A | 9/1998 | Glowny | 395/712 |
| 5,806,078 A | 9/1998 | Hug et al. | 707/511 |
| 5,812,857 A | 9/1998 | Nelson et al. | 395/712 |
| 5,828,887 A | 10/1998 | Yeager et al. | 395/712 |
| 5,832,520 A | 11/1998 | Miller | 707/203 |
| 5,835,911 A | 11/1998 | Nakagawa et al. | 707/203 |
| 5,845,077 A | 12/1998 | Fawcett | 395/200.51 |
| 5,867,714 A | 2/1999 | Todd et al. | 395/712 |
| 5,867,730 A | 2/1999 | Leyda | 395/830 |
| 5,881,236 A | 3/1999 | Dickey | 395/200.51 |
| 5,893,118 A | 4/1999 | Sonderegger | 707/203 |
| 5,909,480 A | * 6/1999 | Reynaud et al. | 379/15.01 |
| 5,909,581 A | 6/1999 | Park | 395/712 |
| 5,955,946 A | * 9/1999 | Beheshti et al. | 340/506 |
| 5,960,189 A | 9/1999 | Stupek et al. | 395/500.43 |
| 5,974,454 A | 10/1999 | Apfel et al. | 709/221 |
| 5,980,090 A | * 11/1999 | Royal et al. | 700/241 |
| 5,999,740 A | 12/1999 | Rowley | 395/712 |
| 6,006,274 A | * 12/1999 | Hawkins et al. | 709/248 |
| 6,009,274 A | 12/1999 | Fletcher et al. | 395/712 |
| 6,067,582 A | 5/2000 | Smith et al. | 710/5 |
| 6,104,875 A | * 8/2000 | Gallagher et al. | 717/168 |
| 6,141,652 A | * 10/2000 | Reeder | 705/53 |
| 6,176,421 B1 | * 1/2001 | Royal et al. | 235/381 |
| 6,247,128 B1 | * 6/2001 | Fisher et al. | 717/178 |
| 6,289,511 B1 | 9/2001 | Hubinette | 717/173 |
| 6,397,247 B1 | * 5/2002 | Shirakawa et al. | 709/223 |
| 6,442,448 B1 | * 8/2002 | Finley et al. | 700/231 |
| 6,463,528 B1 | * 10/2002 | Rajakarunanayake et al. | 713/1 |
| 6,463,534 B1 | * 10/2002 | Geiger et al. | 713/168 |
| 6,470,288 B1 | * 10/2002 | Keidel et al. | 702/122 |
| 6,516,346 B1 | * 2/2003 | Asco et al. | 709/221 |
| 6,584,454 B1 | * 6/2003 | Hummel et al. | 705/59 |
| 6,601,190 B1 | * 7/2003 | Meyer et al. | 714/37 |
| 2001/0034567 A1 | * 10/2001 | Allen et al. | 700/283 |

* cited by examiner

SOFTWARE DOWNLOAD SYSTEM FOR AUTOMATIC RETRIEVAL OF WARRANTY AND COMMISSION DATA

RELATED APPLICATIONS

The present application is related to commonly invented, commonly assigned application Ser. No. 09/611,087, entitled SOFTWARE REMOTE DOWNLOAD METHOD FOR AUTOMATIC RETRIEVAL OF ROYALTY AND WARRANTY INFORMATION, which is hereby incorporated by reference.

FIELD OF THE INVENTION

The present invention relates to updating software in remote locations through the use of an intermediary, a system for tracking what locations have what versions of the software, and a method of assembling a database related to that information.

BACKGROUND OF THE INVENTION

Fueling environments have become more sophisticated in recent years and now include complex software to operate fuel dispensers, site controllers, and a myriad of other devices within the fueling environment. The physical hardware of these devices is routinely upgraded as new features become available. Not only do the devices within the fueling environment continue to be upgraded, but also the software is periodically upgraded as new features or elements are added to the functionality. New software may include merely new features, a new operating system, an upgraded version of an operating system, or the like.

For basic fueling sites, there are typically three components having microprocessor controllers and software associated therewith. The primary computer of the fueling site is generally referred to as the site controller. Each fuel dispenser may also include one or preferably two microprocessors. The first microprocessor controls the core functions of the fuel dispenser such as the opening and closing of valves, meter readings, and the like. The second microprocessor controls the display functions, the printer for receipts, and other functions. These are known as CRIND™ functions by the assignee of the present invention. Some fuel dispensers integrate these two microprocessors into one, but the functions remain the same. Software is used to enable these microprocessors with all the desired functionality. The site controller may communicate with and/or control one or both of the microprocessors in the fuel dispenser depending on the installation.

Presently, companies that supply fuel dispensers and other fueling environment hardware are forced to rely on Authorized Service Contractors (ASCs) to perform upgrades and warranty related service. The company provides the ASC with a floppy disk having the new software version thereon. Upon a request from the fueling environment, an ASC must then personally visit the requesting fueling site and upload the software through the site controller. If the fuel dispenser software is being upgraded, the site controller must download the software to the fuel dispensers at the instruction of the ASC. Furthermore, when the fueling site is responsible for requesting software upgrades, the end result may be a patch work upgrade wherein different versions of software may exist on different fuel dispensers and the site controller. Thus, when the ASC visits the fueling environment to upload a newly requested version of the software to the site controller, the ASC may inadvertently install an upgrade that is incompatible with the existing software on the fuel dispensers, or create other incompatibilities within the system.

Some fuel dispensers store the software for the core functions on EEPROMs rather than other read/write capable memory. Thus, the ASC must manually replace the EEPROMs to perform a software upgrade for the core functions. Assignee of the present invention has recently introduced two fuel dispensers, ECLIPSE™ and ENCORE™ that replace the EEPROMs with FLASH memory. However, for existing fuel dispensers that use EEPROMs, there is great potential for error, as the EEPROMs for the upgrade may have been illegally copied by the ASC and there may be errors in the copied versions. Likewise, if they are improperly installed, additional errors may be generated. Finally, the EEPROMs may not be compatible with the software operating the site controller or the CRIND microprocessors.

Although this system has worked for many years, the pace with which technological advances in the fueling industry are made is accelerating. This acceleration spurs ever more frequent upgrades to the software in the fueling industry. Thus, any problems associated with the system will rapidly become exacerbated.

The present system has other failings in terms of how accounting is performed for the transaction associated with these upgrades. The first transaction is that between the company selling the upgrades and the fueling site purchasing the upgrades. The selling company must have an accurate count of exactly what was provided to the particular fueling site and how many copies were provided so that the fueling site may be billed accordingly. The second transaction lies between the ASC and the company selling the upgrade. The ASC is typically paid for each installation of a program that he or she performs. Thus, again, the selling company must have an accurate count of exactly what was provided to the particular fueling site and how many copies were provided so that the ASC may receive his appropriate commission. In the past, the ASC was responsible for keeping paper records of the work performed. While helpful, such documents are susceptible to fraud, human error, easy loss, or destruction. Additionally, there may be a transaction between the selling company and a third party software vendor. The selling company may owe royalties to the third party software vendor based on the upgrades provided. Thus, an accurate count of the upgrades must be kept so that the royalty payments are kept current.

In short, there remains a need for an improved method by which software upgrades may be distributed to remote fueling sites from the company responsible for the hardware at the fueling site.

SUMMARY OF THE INVENTION

The present invention replaces the floppy disks of the prior art with a portable computing device such as a laptop computer adapted to receive software upgrades from a corporate controlled computer. The portable computing device is issued to the Authorized Service Contractors (ASCs). Upon a request from a fueling site, the ASC is dispatched to the fueling site and links the portable computing device to the site controller to perform the upgrade. The portable computing device includes additional software adapted to sense the number and type of hardware devices available at the fueling site as well as the current version of the software presently installed on each of those devices. The portable computing device then determines if the requested upgrade is compatible with the present hardware and software configuration as well as storing a record of the present hardware and software configuration. If compatible, the software is upgraded as requested, and the record is updated as well. The number and versions of the upgrades installed are appended to the record, eliminating the need for the ASC to keep a paper record of the work performed. Additionally, the ASC may enter a record of any service or maintenance performed at the fueling site, either in conjunction with the software upgrade or as an independent act. This maintenance or service may be required as part of a warranty obligation on the part of the selling corporation, as part of a previously purchased service plan, or as an isolated service call as needed or desired.

Periodically, the ASC accesses the corporate controlled computer and uploads thereto information relating to the upgrades and services that the ASC has performed since the last access. From this information, the corporate entity may arrange for billing to the fueling sites that have purchased upgrades as well as provide commissions to the ASC for the work performed. This may also facilitate payment of royalties to any third party software provider. The upload also includes information about what fueling sites have what hardware and what version of software installed thereon. This is preferably assembled into a database from which recommendations may be made as to what upgrades a particular fueling site should investigate purchasing. Other departments within the corporation may also use the information within this database as needed or desired.

As an added feature of the present invention, the portable computing device may include or have access to intermediate upgrade options or patches to facilitate software upgrades. For example, if the present hardware and software configuration is incapable of accepting the requested upgrade, after identification of this fact, the portable computing device may be able to provide a best alternative solution or provide a required intermediate upgrade prior to providing the requested upgrade. Thus, if the original device were running software v. 1 and the site had requested software v. 3, the portable computing device could upload software v. 2 and then install software v. 3 onto the device. If no such intermediate upgrade is required, then it is not performed. If a known patch exists which enables a particular piece of hardware to function with the requested upgrade, it could similarly be provdided. If no such intermediate upgrade or patch is possible, then no upgrade is performed. Additionally, if the intermediate upgrade or patch is not available, but is feasible, then the portable computing device should have the ability to access the corporate controlled computer remotely and download the intermediate upgrade for uploading to the fueling site.

As a further option, the ASC may use the portable computing device to log in to the corporate computer from the remote site and receive instructions on what updates are needed at a particular site. This information may be provided based on reported configurations. Further, the order in which the updates must be installed may be passed to the ASC at that time. If the updates are not available on the portable computing device, the ASC may download them at that time.

DETAILED DESCRIPTION OF THE PREFERRED EMBODIMENTS

Figure 1:
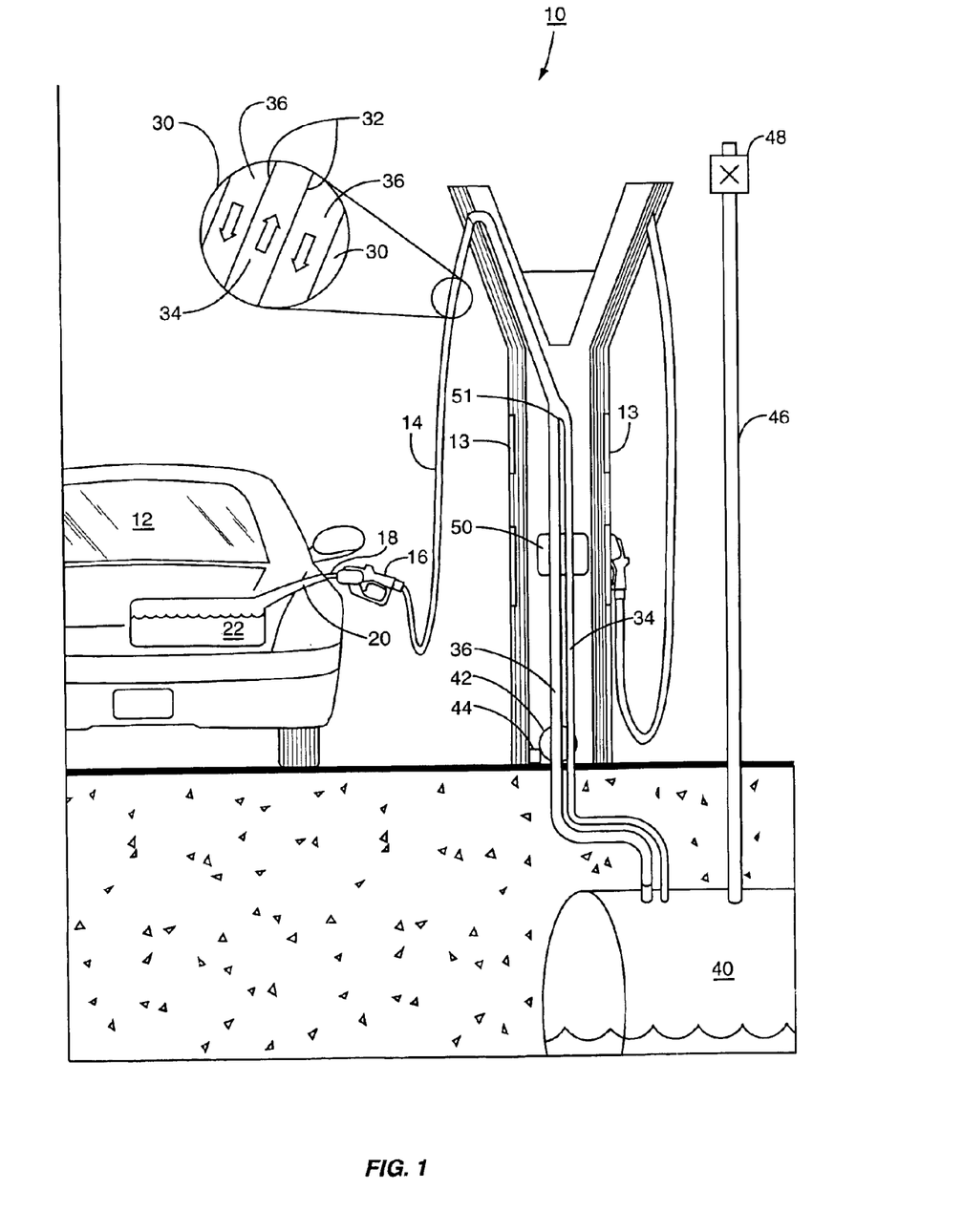
FIG. 1 is a simplified drawing of a fuel dispenser.

The present invention is directed to a method for improving upgrades to software in a fueling environment. However, a discussion of the physical elements comprising a fuel dispensing environment will be helpful as a background. Turning now to FIG. 1, a fuel dispenser 10 is adapted to deliver a fuel, such as gasoline or diesel fuel to a vehicle 12 through a delivery hose 14, and more particularly through a nozzle 16 and spout 18. The vehicle 12 includes a fill neck 20 and a tank 22, which accepts the fuel and provides it through appropriate fluid connections to the engine (not shown) of the vehicle 12. A display 13 provides a user interface from which the user can determine a cost associated with a particular fueling transaction. While display 13 is preferably a visual display, it may equivalently be an audio user interface, such as might be used by the visually impaired or the like.

Flexible delivery hose 14 is a flexible member 30 that includes the product delivery line 36 and the vapor return line 34. Both lines 34 and 36 are fluidly connected to an underground storage tank (UST) 40 through the fuel dispenser 10. UST 40 may be vented by a vent line 46 capped by a vent valve 48 as is well understood in the art. Once in the fuel dispenser 10, the liens 34 and 36 separate at split 51. Note that split 51 need not be precisely where indicated, it only need be positioned within the housing of the fuel dispenser 10. Pump 42, controlled by motor 44 extracts fuel from the UST 40 and provides it to product delivery line 36. This can be done by creating a vacuum in line 36 or other equivalent means.

A vapor recovery system is typically present in the fuel dispenser 10. During delivery of fuel into the vehicle fuel tank 22, the incoming fuel displaces air containing fuel vapors. Vapor is recovered from the vehicle fuel tank 22 through the vapor return line 34 with the assistance of a vapor pump (not shown). A motor (also not shown) powers the vapor pump. A control system 50 receives information from a meter and a pulser in the fuel delivery line 36. Meter measures the fuel being dispensed while the pulser generates a pulse per count of the meter. Typical pulsers generate one thousand (1000) pulses per gallon of fuel dispensed. Control system 50 controls a drive pulse source that in turn controls the motor. The vapor recovery pump may be a variable speed pump or a constant speed pump with or without a controlled valve (not shown) as is well known in the art.

Control system 50 may be a microprocessor with an associated memory or the like and also operates to control the vast majority of the various functions of the fuel dispenser 10 including, but not limited to: those functions discussed above, fuel transaction authorization, encryption associated with fuel transaction authorization, fuel grade selection, display and/or audio control. As noted, control system 50 may actually comprise two microprocessors that may communicate with one another. Recent advances in the technology associated with the fuel dispenser 10 now enable the fuel dispenser 10 to act as an Internet interface, provide content, allow music downloads, or other functionality. Resident in the memory associated with the control system 50 is software that facilitates all of these functions. As a result of these increasing numbers of functions, the software resident in the memory associated with the control system 50 must periodically be upgraded to support new functions or improvements on existing functions.

Figure 2:
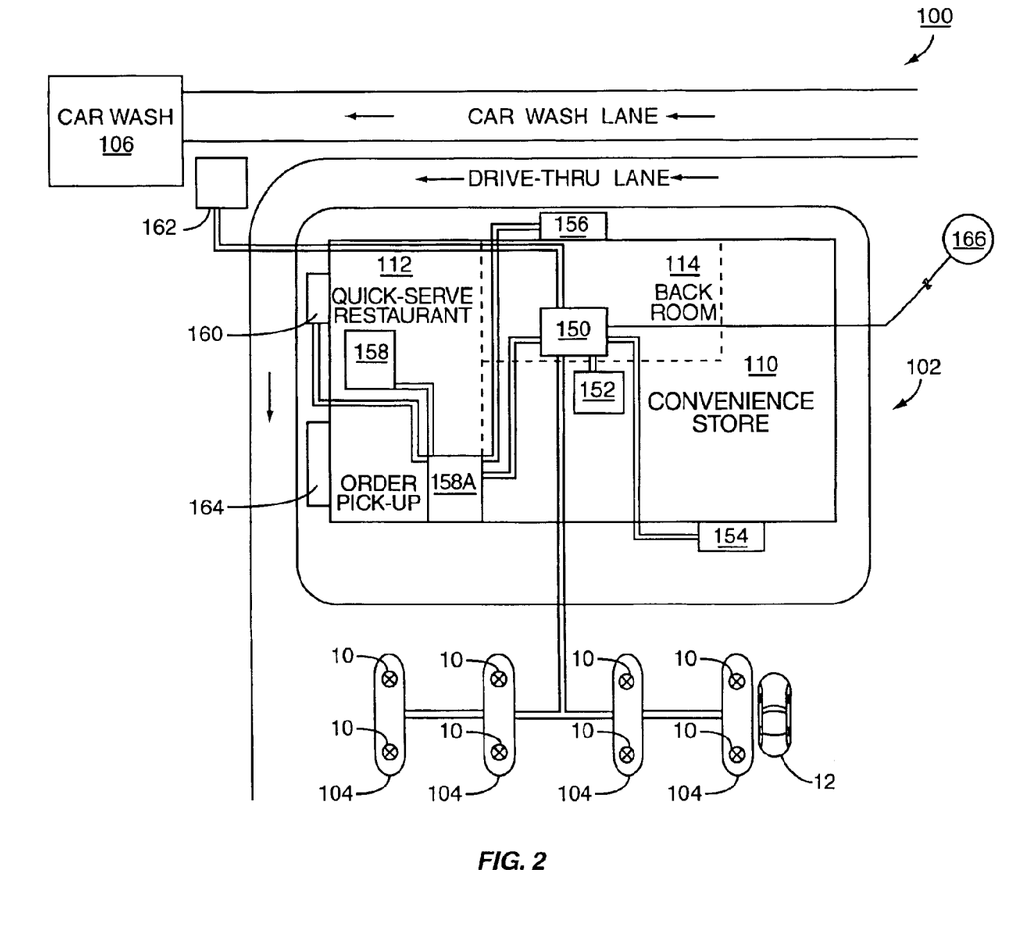
FIG. 2 is a simplified drawing of a fueling environment.

In addition to fuel dispenser 10, other devices may exist within a fueling site 100 that likewise may require electronic control systems and software to enable those electronic control systems be better understood with reference to FIG. 2. Fueling site 100 may include a primary building 102, a plurality of fueling islands 104, a car wash 106, and other outbuildings as needed or desired. Primary building 102 may include a convenience store 110, a quick serve restaurant 112, a back room 114, and other subdivisions as needed or desired. It should be appreciated that the fueling site 100 is preferably an integrated fueling site that enables purchases of a multitude of goods and services at a multitude of locations, such as that discloses in U.S. Pat. No. 6,098,879, which is hereby incorporated by reference.

A site controller 150 for controlling this fully integrated fueling site may be positioned in back room 114, or other location within the fueling site 100 as needed or desired. Site controller 150 is preferably a computer, such as the G-SITE® sold by assignee of the present invention. Site controller 150 is communicatively linked to fuel dispensers 10, a station attendant terminal 152 positioned within the convenience store 110, an external customer terminal 154, an external quick serve restaurant order terminal 156, an internal quick serve restaurant terminal 158, an external sensor 160, a car wash terminal 162, and other electronically controlled terminals positioned throughout the fueling site 100. Quick serve restaurant 112 may include an auxiliary order pick up terminal 158A that is proximate an order pick up window 164. These terminals and sensors facilitate the fully integrated nature of the fueling site 100.

Additionally, the site controller 150 may control vapor control systems such as the vent valve 48, a site wide vapor recovery pump, or other such devices that may exist within fueling site 100. This may be part of a comprehensive vapor management plan designed to comply with the ever more restrictive CARB requirements or other government regulations. Such vapor management systems may have their own microprocessors and memory, or may be integrated into the site controller 150 as needed or desired. However, every change in the regulations may result in a change in the software or hardware and software to comply with the new regulation.

Site controller 150 may also have access to remote content providers 166 such as through the Internet, a dedicated phone line or the like. In the preferred embodiment, this is a high speed, large bandwidth connection allowing for fast transfers of large amounts of data.

Reference is again made to the previously incorporated '879 patent for a full description of the myriad terminals and stations within the fueling site 100. That patent also provides a nice description of the potential functions that many of the terminals and stations may perform.

Figure 3:
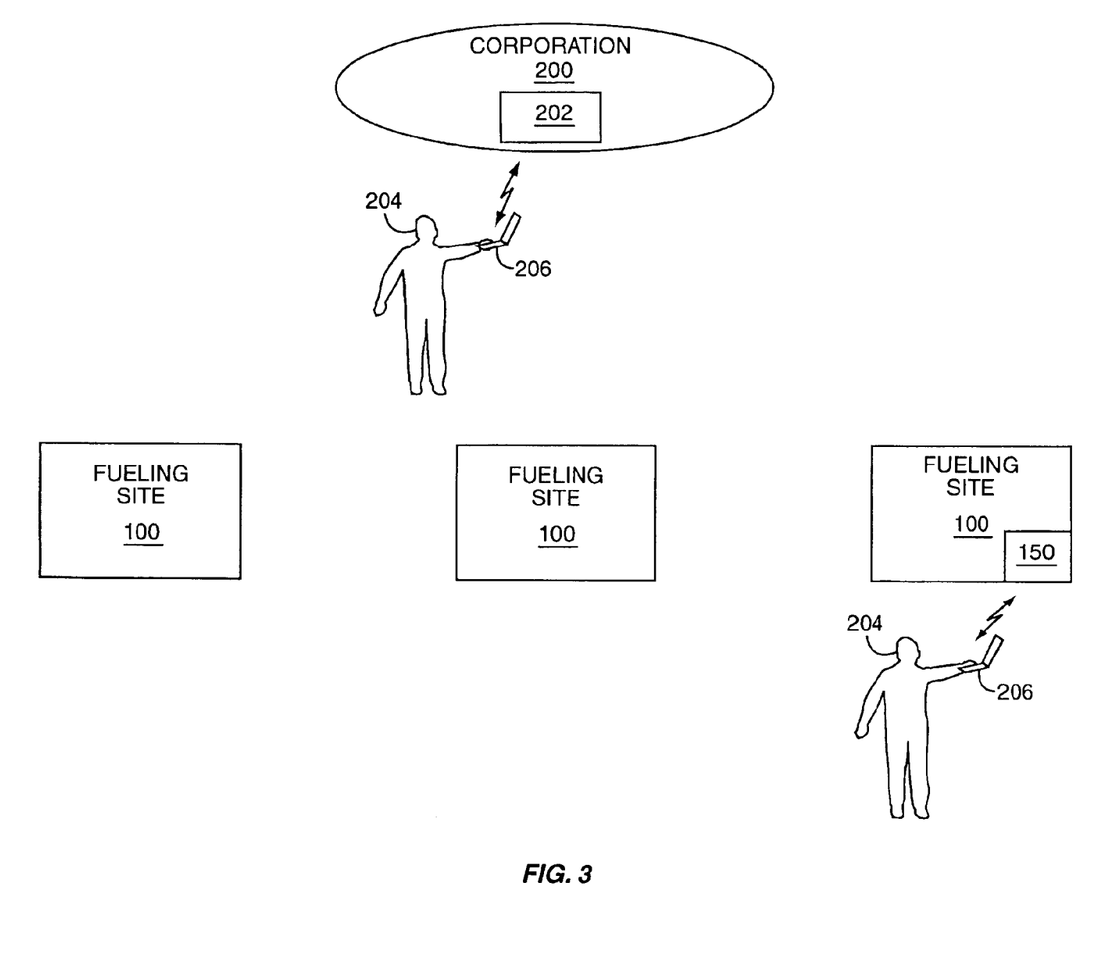
FIG. 3 is a simplified drawing of the overarching system of the present invention.

Turning now to FIG. 3, the system of the present invention is disclosed. Corporation 200 supplies the hardware and software to the fueling sites 100 as is well understood. Examples of such a corporation include Marconi Commerce Systems, Tokheim, Wayne, and the like. While a corporate entity is contemplated, it should be appreciated that for the purposes of the present invention, an S corporation, a partnership, a sole proprietorship, or other legal entity is also intended to be within the confines of the term "corporation." Corporation 200 may include a corporate computer 202. Corporate computer 202 may include a single server, a multitude of servers being interconnected through a local area network (LAN) or a wide area network (WAN), may include an external portal to the Internet, or may be a closed system that is only accessible by physically porting into the computer 202 or other conventional computing arrangements as are well understood. In the preferred embodiment, corporate computer 202 hosts a web page that acts as a portal to data stored within memory associated with the computer 202. It should be appreciated that the web page may include publicly accessible portions as well as proprietary portions that are only accessible through a firewall or other security measure.

An Authorized Service Contractor (ASC) 204 may be in possession of a portable computing device 206 such as a laptop computer sold by IBM. Particularly excluded from the definition of a portable computing device is a memory unit without any processing power such as a simple floppy disk. While not preferred, other portable computing devices are contemplated such as a cellular phone, personal digital assistant, or the like. Portable computing device 206 may communicate with the corporate computer 202 by means of a wire based or wireless connection as is well understood in the art. This may be accomplished with a DSL modem, a cable modem, a wireless modem, or other modem as needed or desired as well as the appropriate software to control such as modem. Alternatively, the portable computing device 206 may be selectively networked with the corporate computer 202 such over a LAN having dedicated ports for such a connection. Other well known communicative connections are also contemplated.

Further, the portable computing device 206 is adapted to communicate with the site controllers 150 at the fueling sites 100. Again, this communication may be over any conventional communication means, wired or wireless, networked or dial in access as needed or desired.

Armed with this knowledge of the elements, a description of the methodology of the present invention may be better understood. In particular, to provide for the coherent and productive upgrading of software within fueling sites 100 based on upgrades made available from the corporation 200, reference is made to FIGS. 4–6. Beginning with FIG. 4, an ASC 204 acquires a portable computing device 206 (block 300) and accesses the corporate computer 202 (block 302). This access, as previously noted, may be wireless or wire based and may be accomplished through any number of conventional computer to computer communication techniques. Additionally, note that it may be preferred that the portable computing device 206 access the corporate computer 202 through a web page. Again, access to the web page may be done directly through direct communication with the corporate computer 202, or it may be done via the Internet as is well known. Portable computing device 206, subsequent to access, may download new versions of software from the corporate computer 202 (block 304). Portable computing device 206 stores this software in a memory unit (block 306). This may be done on a hard drive, in flash memory, in an auxiliary memory unit such as a read/write CD, a zip drive, or the like as needed or desired. However, preferably, the software is stored on the hard drive associated with the portable computing device 206.

Figure 4:
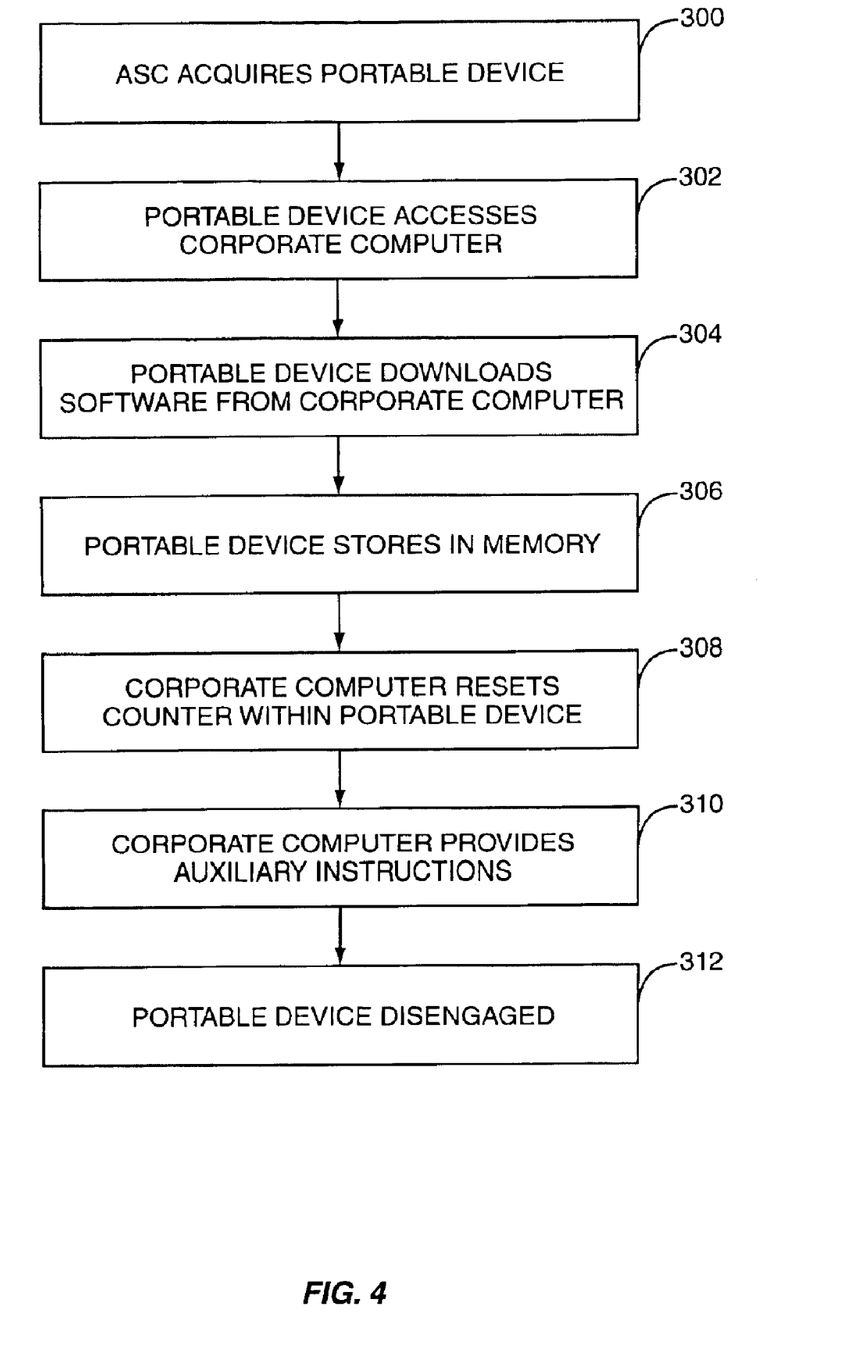
FIG. 4 is a flow chart for the ACS to corporate computer download transaction.

Corporate computer 202 may reset any counters within the portable computing device 206 (block 308). These counters correspond to any work (i.e., remote software upgrades) already performed by the portable computing device 206. Specifically, the portable computing device 206 should indicate that no versions of software have been uploaded and need to be accounted for by the corporate computer 202. Alternatively, and equivalently, the corporate computer 202 may provide a time stamp to the portable computing device 206 such that all work prior to the time stamp is effectively ignored or purged from memory. This is to prevent an ASC 204 from being credited for work previously performed and for which there has already been an accounting. Other ways to perform this function may be readily apparent to those of ordinary skill in the art. The techniques listed herein are exemplary and not intended to be limiting.

Corporate computer 202 provides any auxiliary instructions (block 310) to the portable computing device 206. These auxiliary instructions may include a conflict checking instruction that identifies earlier software versions with which the present version is incompatible. Likewise, hardware that will not support the present software version may be identified. Further, solutions to known conflicts that have been developed, typically known as "patches" in the computer industry may also be provided. Patches as used herein also includes workarounds and supplying intermediate upgrades so that the latest version of a software package is adequately supported. Other auxiliary instructions may also be included if needed or desired.

Finally, the portable computing device 206 is disengaged from its communicative link with the corporate computer 202 (block 312). Note that the precise order of the download need not identically follow that set out in FIG. 4. For example, the auxiliary instructions could be downloaded prior to the download of the new software package.

Additionally, note that there may be a verification step wherein the corporate computer 202 verifies the identity of the portable computing device 206. This may be done by password protection, a particular encryption authorization process, or the like as needed or desired. This will reduce the likelihood of industrial secret theft by unauthorized access to the new software. The particular verification process is not material to the present invention. Likewise, the portable computing device 206 may verify the identity of the corporate computer 202 before accepting a software download.

Figure 5:
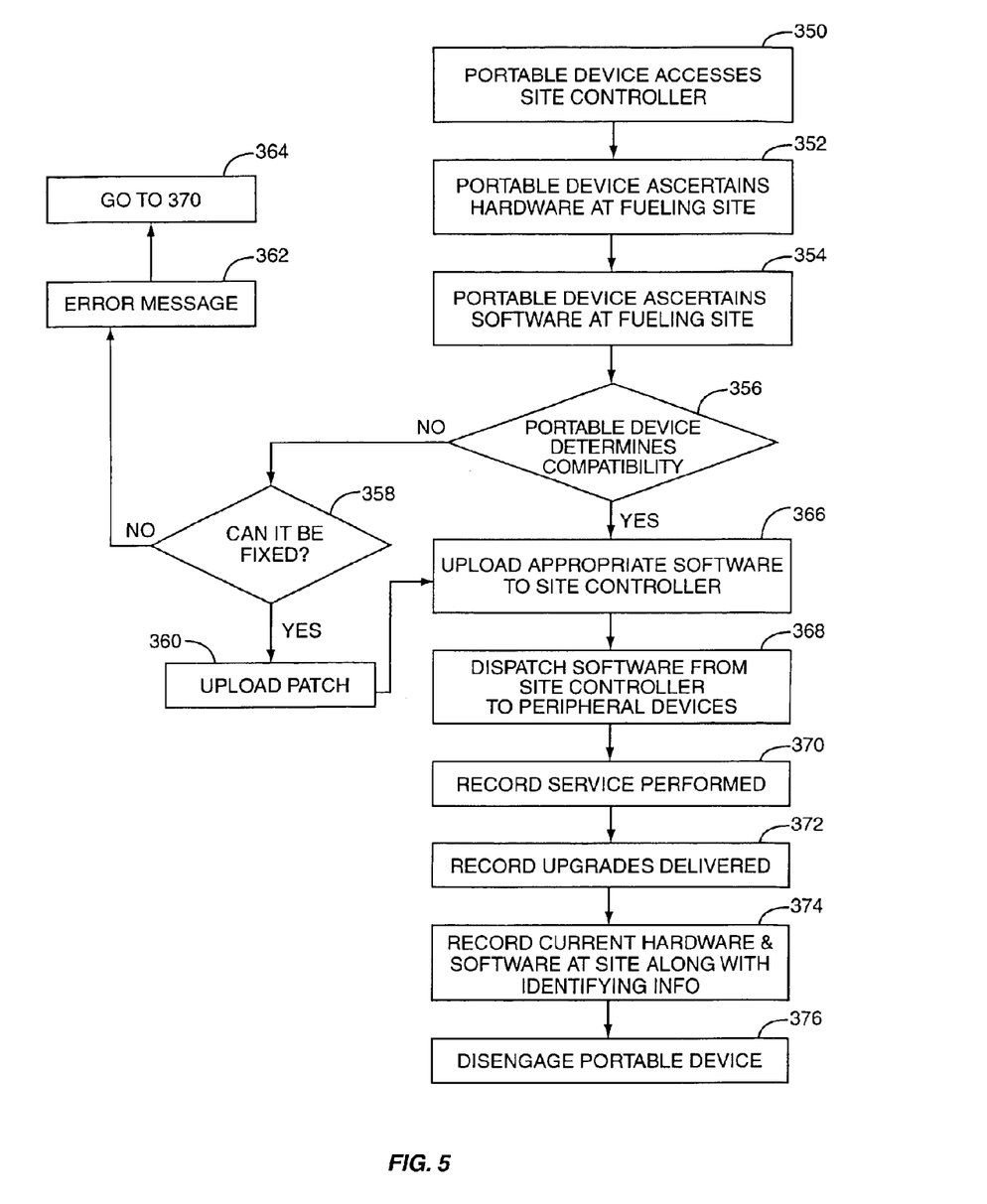
FIG. 5 is a flow chart for the ACS to fuel environment upload transaction.

Armed with the new software stored on the portable computing device 206, the ASC 204 then travels personally to a fueling site 100 that has requested a software upgrade or other service. ASC 204 is alerted to the request of the fueling site 100 by conventional techniques as are already used in the industry. For example, an electronic message may be sent to the ASC 204 if desired. The use of wireless communication technology such as cellular phones and pagers may also facilitate the expedient transfer of information from the corporation 200 taking an order for a software upgrade to the ASC 204. Reference is now made to FIG. 5 that shows in a flow chart the steps that the ASC 204 takes upon arrival at the fueling site 100 that has requested a software upgrade or other service.

In particular, the ASC 204 uses the portable computing device 206 to access the site controller 150 (block 350). This, as noted above, may be through any conventional wire based or wireless communications technique. Portable computing device 206 then polls the hardware within the fueling site 100 for the current configuration of hardware (block 352). This will report how many peripheral terminals, sensors, and other devices are located at the fueling site 100. Typical information includes indicia relating to devices such as a car wash terminal 162, how many dispensers 10, drive through external sensor 160, the vapor management system, and the like. Furthermore, the polling will also determine what software, including version number, is presently operating on each of these peripheral devices and the site controller 150 (block 354).

The present discussion operates under the assumption that the fueling site 100 has requested an upgrade. However, this need not be the case. Upgrades could be provided automatically as part of an existing service contract, as part of a warranty, or other contractual relationship as needed or desired. In any event, the portable computing device 206 may access the corporate computer 202 after polling to determine what upgrades are needed or possible. Such remote access is discussed in greater detail below. If the portable computing device 206 does not have the upgrade resident in its own memory, it may download the upgrade as needed.

Portable computing device 206 may then determine whether or not the requested software upgrade is compatible with the presently existing hardware and software at the fueling site 100 (block 356). If the answer is no, the current software and hardware will not support an upgrade to the requested software, then the portable computing device 206 determines if the problem can be fixed by providing a patch (block 358). This may be done by accessing the corporate computer 202 and receiving instructions on what patches are available and in what order they must be installed. Other techniques are also contemplated. Thus, if it is known that the particular upgrade is incompatible with a previous version of software installed in hardware deployed at fueling sites, but that this problem may be fixed through the installation of an intermediate version of the software prior to the installation of the requested version, then the problem may be deemed fixable. If the answer to block 358 is yes, the problem is fixable, then the appropriate patch is uploaded to the site controller 150 (block 360). Note that this patch upload may involve the portable computing device 206 contacting the corporate computer 202 from the fueling site 100 to download the patch, if the patch is not in the memory device of the portable computing device 206. This remote access may be accomplished by a phone line, a wireless connection, or through the fueling site's access to remote content providers 166 previously discussed.

If the problem cannot be fixed, then an error message may be generated (block 362) and the process continues to block 370 (block 364). Once the patch has been installed, then the portable computing device 206 uploads the requested software to the site controller 150 (block 366). Software so uploaded is transferred from the site controller 150 to the peripheral devices if appropriate (block 368). Note that the patch may be installed after the requested software in some instances if needed or desired.

Portable computing device 206 then records any warranty service performed by the ASC 204 at the fueling site 100 (block 370). This may include any maintenance, repairs, or other service that warranties on the hardware including the fuel dispenser 10 present at the fueling site 100 may require. Further, the portable computing device 206 records any software upgrades that have been delivered (block 372) including any patches delivered. This may include an indication of the previously existing version of the software prior to the upgrade. The ability to distinguish between what was in place and what was installed may have an impact on the royalty due any third party software vendor. Still further, the portable computing device 206 records all the current hardware and software at the fueling site 100 along with identifying information (block 374) such as the physical street address, the client number, or the like so that the information about the hardware, software, the upgrades, and service may be appropriately attributed to the correct fueling site 100. Finally, the portable computing device 206 is disengaged from the site controller 150 and the ASC continues about his merry way (block 376).

It should be appreciated that security concerns may dictate that the identity of the site controller 150 be verified prior to any data transfer and that the site controller 150 may verify the identity of the portable computing device 206 prior to acceptance of any software revisions. This may be accomplished by any known technique such as an encrypted verification code, a password, or the like as needed or desired.

Note that the portable computing device 206 could access the peripheral devices of the fueling site 100, namely the fuel dispenser 10 and other peripherals, directly and provide software upgrades thereto. However, this is not preferred, because it requires additional security measures at each peripheral device and does not take advantage of the fact that the site controller 150 already communicates with the peripheral devices and thus requires only one access point.

Figure 6:
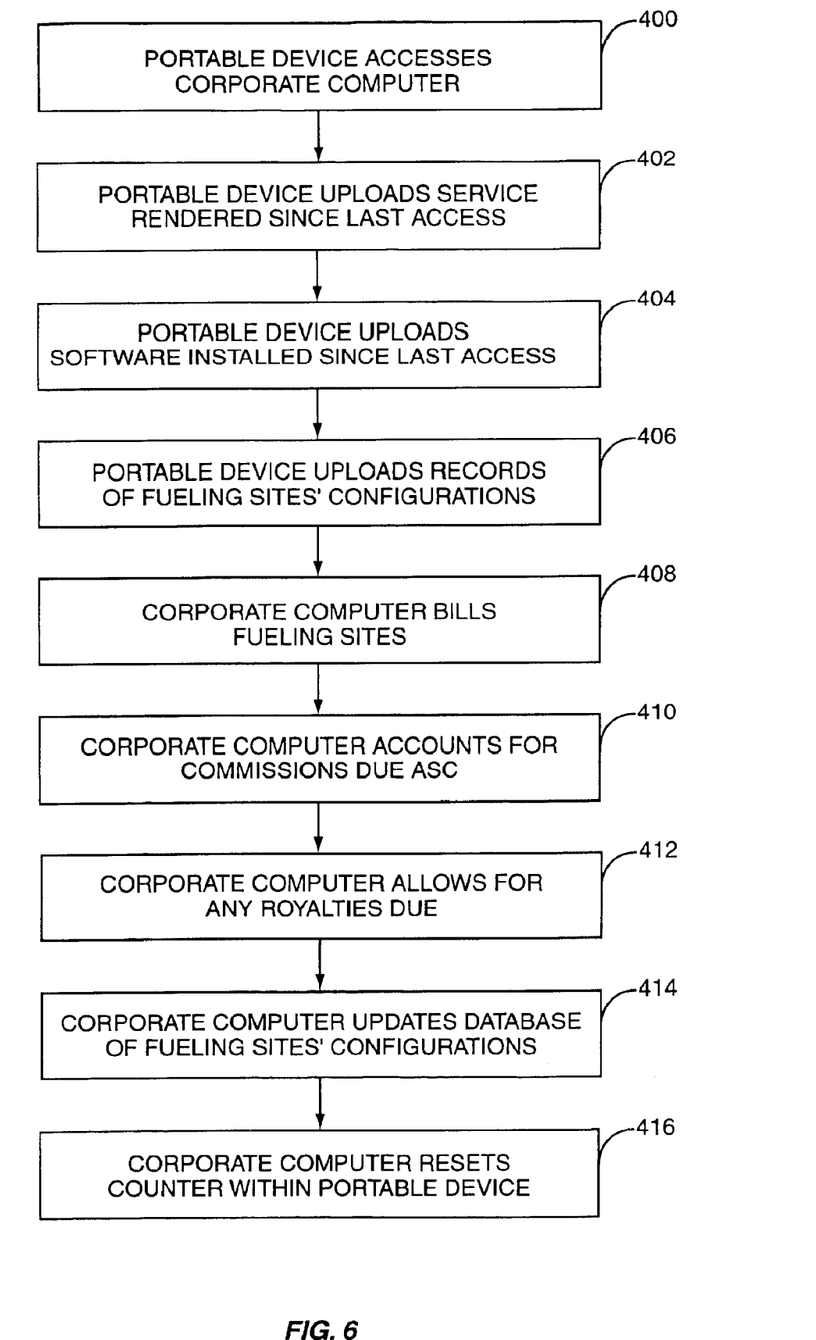
FIG. 6 is a flow chart for the ACS to corporate computer upload transaction.

Having completed all the visits to different fueling sites 100 that are required, the ASC 204 should periodically use the portable computing device 206 to access the corporate computer 202 (block 400) as noted in FIG. 6. This subsequent access may be accomplished in the same manner that the first access was accomplished, and is preferably through a web page. This access may in particular be done remotely if needed or desired. Again, note that appropriate security measures are taken to prevent fraudulent access to the corporate computer 202 and the portable computing device 206. Portable computing device 206 uploads to the corporate computer 202 a record of all services that have been rendered to the disparate fueling sites 100 since the last time the portable computing device 206 accessed the corporate computer 202 (block 402). Portable computing device 206 may then upload records of the software installed since the last access (block 404). This includes a number of each version of software that was installed. For example, six copies of version seven were installed. Finally, the portable computing device 206 uploads the records of fueling sites' present configurations (block 406). Implicit in all of these uploads are identifying information that links the particular service performed to a location at which the service was performed, the particular software installed to a location at which the software was installed, and the location at which a particular configuration of software and hardware may exist. Further, indicia representing the ASC 204 that performed the work is also included. Note that both sessions wherein the portable computing device 206 communicates with the corporate computer 202 may be dictated in part by JAVA applets that control the portable computing device 206 during connection to the corporate computer 202.

Corporate computer 202 may then bill the fueling sites 100 accordingly for the services and software provided (block 408). Note that the fueling sites 100 may already have paid for the services and software as part of a service contract, or as part of the original warranty. In either case, the corporate computer 202 may make an entry on the invoice that the service was performed or the software was delivered. Corporate computer 202 may then account for any commissions that are due the ASC 204 as a result of the services provided and the software installed (block 410). This may include calculating a commission rate, calculation of number of jobs performed, charging against an invoice, or any other required accounting procedure. Payment may be made to the ASC 204 in any conventional fashion such as printing a check, direct deposit, or the like.

Corporate computer 202 may then account for any royalties due third party software vendors (block 412) that may result from software upgrades performed by the ASC 204. This may include creating an invoice, making a charge against a payment received from a fueling site 1100, or any other accounting procedure as is well understood in the art.

Corporate computer 202 may also update a database containing information about the customers' present hardware and software configurations (block 414). Specifically, the corporate computer 202 may link a location identifier with the configurations and from the configuration make recommendations on potentially desirable upgrades that may be available to a particular fueling te 100 based on what is presently installed at that location.

Finally, the corporate computer 202 should reset counters within the portable computing device 206 to reflect that the ASC 204 has been credited for all work performed since the last access to the corporate computer 202 (block 416). This may also be accomplished with a timestamp function as previously described.

Please note that the order of steps presented above is not necessarily an absolute. Alternative, equivalent orders are also contemplated and within the scope of the present invention.

Additional functions may also be performed in the corporation 200 with the information uploaded from the portable computing device 206 to the corporate computer 202. In particular, a service department of the corporation 200 may access the records to make sure that fueling sites 100 are getting the service for which they have contracted, or that they need to stay competitive. Additionally, a warranty department could access to records to make similar inquiries, but related more specifically to service and upgrades that are required as part of a warranty contract. Further, a marketing department could access the information to determine which fueling sites 100 should receive mailings notifying them of newly available upgrades, service options, or the like that may be helpful to the fueling site 100. While the term "department" has been used, the term is used herein to include occasions where there is not a corporate structure, or personnel who perform these functions are not necessarily organized in a discrete department. The term is meant to be construed broadly.

Additionally, a personnel department may use the information provided to evaluate an efficiency associated with a particular ASC. This may be determined by comparisons to other ASCs, other empirical evidence, or other criteria as needed or desired. Further, an inquiry as to the quality of the service may be generated and sent to the fueling site 100 that received the service. This may help customer relations if feedback generated as a result of the inquiry is acted upon.

Still further, the costs associated with the services and upgrades may be evaluated by personnel in marketing to determine warranty pricing based on the number of upgrades that are being performed. Additionally, the costs associated with upgrades and services may be matched against research and development costs to determine if pricing associated with the products corresponds to the costs associated with creating those products. Other database mining may be accomplished as needed or desired. The present examples are not intended to be limiting.

The present invention may, of course, be carried out in other specific ways than those herein set forth without departing from the spirit and essential characteristics of the invention. The present embodiments are, therefore, to be considered in all respects as illustrative and not restrictive, and all changed coming within the meaning and equivalency range of the appended claims are intended to be embraced therein.

What is claimed is:

1. A method of upgrading software to a computer at a fueling site from a corporate computer, said method comprising:

downloading a software upgrade from the corporate computer to a portable computing device;

accessing a computer at a fueling site with said portable computing device; and uploading said software upgrade to said computer at said fueling site.

2. The method of claim 1 wherein said software upgrade comprises an executable program for use on said computer at said fueling site and wherein said computer at said fueling site is selected from the group consisting of a site controller and a fuel dispenser.

3. The method of claim 1 further comprising storing a record indicative of a quantity of upgrades performed.

4. The method of claim 1 further comprising downloading said software upgrade from said computer to a peripheral device.

5. The method of claim 1 further comprising determining a hardware and software configuration at said fueling site.

6. The method of claim 5 further comprising storing a record indicative of said hardware and software configuration.

7. The method of claim 6 further comprising subsequently providing said record indicative of said hardware and software configuration to said corporate computer.

8. The method of claim 7 further comprising compiling a database of a plurality of records indicative of said hardware and software configurations.

9. The method of claim 1 further comprising subsequently accessing said corporate computer to secure an accounting for upgrades installed.

10. The method of claim 9 further comprising accounting for royalties due a third party based on said upgrades installed.

11. The method of claim 1 wherein accessing said computer comprises accessing a site controller at said fueling site.

12. A method of generating a database of fueling site configurations, comprising:

sending an individual equipped with a portable computing device to a plurality of remote fueling sites;

polling with said portable computing device; hardware and software existent at each of said remote fueling sites;

storing a plurality of records, each of said records relating to different ones of said remote fueling sites, said record detailing the fueling site configuration including hardware and software; and uploading to a corporate computer said plurality of records.

13. The method of claim 12 further comprising providing the portable computing device to said individual.

14. The method of claim 12 wherein uploading to corporate computer comprises uploading to said corporate computer through a web based interface.

15. The method of claim 12 wherein polling comprises polling through a site controller.

16. The method of claim 12 further comprising generating a database from said plurality of records and generating recommendations as to potential upgrades from said database.

17. A method of tracking payment obligations comprising:

providing software upgrades on a portable computing device;

directing said portable computing device to a remote location including at least one remote fueling site;

accessing with said portable computing device a computer at said remote location;

upgrading one or more software components of one or more computers at said remote location;

storing a record of any upgrades provided; and uploading said record to a corporate computer for determination of payment obligations.

18. The method of claim 17 wherein said payment obligations comprise royalty obligations.

19. The method of claim 17 wherein said payment obligations comprise communicating obligations.

20. The method of claim 17 further comprising accounting for said payment obligations.

21. The method of claim 17 wherein upgrading one or more software components comprises upgrading an executable software component of a site controller at said at least one remote fueling site.

22. The method of claim 21 further comprising determining if said upgrading resulted from a warranty contract.

23. The method of claim 22 further comprising accounting for said remote fueling sit if said upgrading fell outside of any warranty contract obligation.

24. The method of claim 17 wherein storing a record of any upgrades provided computes storing a version number associated with each of said any upgrades.

25. The method of claim 17 wherein storing a record of any upgrades provided comprises storing a number of upgrades provided.

26. The method of claim 17 wherein storing a record of any upgrades provided comprises storing a version number associated with software existent prior to said upgrade.

27. A portable computing device comprising software adapted to:

communicate with a corporate computer and download therefrom a software upgrade package;

communicate with a computer at a remote fueling location and install one or more of said software upgrade packages;

poll said computer at said remote fueling location to determine a hardware configuration and a software configuration at said remote fueling location; and record indicia relating to a number of software upgrade packages installed.

28. The portable computing device of claim 27 wherein said software is further adapted to communicate said recorded indicia to said corporate computer for the purpose of facilitating an accounting therefrom.

29. The portable computing device of claim 27 wherein said software is further adapted to install a patch to enable functioning of said software upgrade on said computer at said remote fueling location.

30. A system for upgrading software at remote fueling sites, comprising:

a portable computing device;

a corporate computer including means for downloading to said portable computing device, said downloading means transferring a software upgrade to said portable computing device;

a remote fueling site including a site controller, said site controller including means to upload said software upgrade from said portable computing device; and wherein said portable computing device includes means for determining a hardware configuration and a software configuration at said remote fueling site, means for recording said configuration, and means to transfer said configuration to said corporate computer.

31. The system of claim 30 wherein said portable computing device further includes means for recording commission related data based on a number of software upgrade installations performed by said portable computing device.

32. A system for upgrading software at remote fueling sites, comprising:

a portable computing device;

a corporate computer including means for downloading to said portable computing device, said downloading means transferring a software upgrade to said portable computing device; and wherein said portable computing device includes means to transfer said software upgrade to a device at a remote fueling site.

33. The system of claim 32 wherein said portable computing device is a laptop computer.

34. The system of claim 32 wherein said portable computing device is a personal digital assistant.

35. The system of claim 32 wherein said portable computing device further includes means for determining upgrades needed at the remote fueling site.

36. The system of claim 35 wherein said determining means comprises communications means for accessing the corporate computer.

37. The system of claim 32 wherein said transferring means is adapted to communicate with a site controller at the remote fueling site.

38. The system of claim 32 wherein said transferring means is adapted to communicate with a fuel dispenser at the remote fueling site.

* * * * *